Patented Feb. 9, 1937

2,070,353

UNITED STATES PATENT OFFICE 2,070,353

MANUFACTURE OF ISATIN COMPOUNDS USEFUL FOR PROTECTION AGAINST MOTHS

Jakob Bindler, Basel, Switzerland, assignor to the firm "J. R. Geigy S. A.", Basel, Switzerland No Drawing. Original application July 27, 1933, Serial No. 682,531. Divided and this application December 13, 1934, Serial No. 757,404. In Switzerland September 3, 1932

10 Claims. (Cl. 260—47)

This application is a division of application Ser. No. 682,531, filed July 27, 1933.

According to the present invention compounds useful as protective agents against moths are obtained by condensing an isatin sulphonic acid with a phenol or homolgue of phenol substituted in the nucleus by an alkyl-group containing three or more carbon atoms or by one or two halogen atoms or simultaneously by both kinds of substituents.

In particular, the improved process consists in condensing an insatin-5-sulphonic acid with a substituted phenolic body of the benzene series of the general formula:

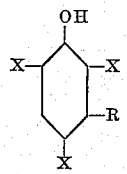

wherein X may stand for hydrogen or chlorine, and R for hydrogen or methyl and whereby at least one of these substituents must be other than hydrogen.

The new compounds are colourless substances which are freely soluble in water. They can be permanently incorporated in animal fibres even from a weakly acid bath.

The condensation of the isatin sulphonic acid with the substituted phenol is advantageously conducted in presence of a compound having a strong accelerating action, such as a mineral acid, zinc chloride or stannic chloride.

Water-soluble condensation products from isatin and phenols have hitherto not been applied for combatting larvae of moths. The condensation product, insoluble in water, from isatin and phenol is in the form of its 0-0'-diacetyl compound a known mildly acting laxative. From the physiological properties of this compound it could in no way be foreseen that the water soluble derivatives made in accordance with the invention would be quite particularly suitable for permanently protecting animal fibres against damage by moths owing to their specific toxic action on the larvae of moths and their property of becoming fixed, when applied by means of an acid bath, in a manner fast to washing and to fulling.

The following examples illustrate the invention, the parts being by weight:—

*Example 1*

10 parts of isatin-5-sulphonic acid, 15 parts of 6-chloro-meta-cresol having the formula:

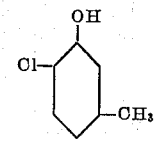

and 125 parts of sulphuric acid of 80 per cent strength are stirred together for 6 hours at 50–60° C. After completion of the reaction has been recognized by tests, the reaction mixture is poured onto ice and such a quantity of water is added that the precipitate which has been formed dissolves on heating. The solution is boiled with some animal charcoal and filtered. On allowing the filtrate to cool the condensation product separates in the form of the free sulphonic acid.

*Example 2*

14 parts of isatin-5-sulphonic acid, 17 parts of para-chlorophenol having the formula:

and 10 parts of concentrated sulphuric acid are intimately mixed together and 30 parts of sulphuric acid are then gradually added to the mixture in such a manner that the temperature does not rise above 60° C. At this temperature the mixture is allowed to stand for 4–5 hours, whilst stirring. After tests have indicated the completion of the reaction, the whole is allowed to stand over-night at ordinary temperature and is then poured into 400 parts of ice water and the product is salted out by the addition of 20 per cent of common salt.

The acid sodium salt is separated by filtering, redissolved in 400 parts of water, the solution is neutralized by means of potassium carbonate (6 parts) and the product is salted out by the addition of 30 parts of potassium chloride. The potassium salt of the condensation product separates at first in a resinous form and changes on standing into a white precipitate.

*Example 3*

10 parts of isatin-5-sulphonic acid, 17 parts of 2:4-dichlorophenol having the formula:

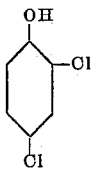

and 100 parts of concentrated sulphuric acid are intimately mixed and the mixture is allowed to stand at 50° C. for 24 hours whilst continuously stirring. The whole is poured into 600 parts of water and the product is salted out by the addition of 120 parts of common salt. The acid sodium salt which separates is redissolved in water, the solution is made feebly alkaline with sodium carbonate and the product is again salted out. The purified product is obtained in the form of a white powder.

What I claim is:—

1. A process for the manufacture of compounds useful for protection against moths, consisting in condensing isatin-5-sulphonic acid with a substituted phenolic body of the benzene series of the general formula:

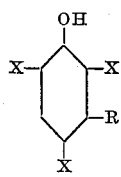

wherein X stands for one of the group consisting of hydrogen and chlorine, and R stands for one of the group consisting of hydrogen and methyl and wherein at least one of these substituents must be other than hydrogen.

2. A process for the manufacture of compounds useful for protection against moths, consisting in condensing isatin-5-sulphonic acid with a chlorophenol.

3. A process for the manufacture of compounds useful for protection against moths, consisting in condensing isatin-5-sulphonic acid with a dichlorophenol.

4. A process for the manufacture of compounds useful for protection against moths, consisting in condensing isatin-5-sulphonic acid with 2:4-dichlorophenol.

5. A process for the manufacture of compounds useful for protection against moths by condensing isatin-5-sulphonic acid with para-chlorophenol.

6. A process for the manufacture of compounds useful for protection against moths by condensing isatin-5-sulphonic acid with 6-chlorometacresol.

7. A compound useful for protection against moths consisting of a product of condensation of isatin-5-sulphonic acid with a substituted phenolic body of the benzene series of the general formula:

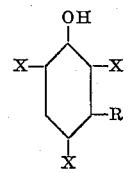

wherein X stands for one of the group consisting of hydrogen and chlorine, and R stands for one of the group consisting of hydrogen and methyl and wherein at least one of these substituents must be other than hydrogen.

8. A compound useful for protection against moths consisting of a product of condensation of isatin-5-sulphonic acid with 2:4-dichlorophenol.

9. A compound useful for protection against moths consisting of a product of condensation of isatin-5-sulphonic acid with para-chlorophenol.

10. A compound useful for protection against moths consisting of a product of condensation of isatin-5-sulphonic acid with 6-chlorometacresol.

JAKOB BINDLER.